United States Patent [19]

Brumme

[11] Patent Number: 4,847,858
[45] Date of Patent: Jul. 11, 1989

[54] OPTICAL RESONATOR FOR A LASER

[75] Inventor: Gerhard Brumme, Eching am Ammersee, Fed. Rep. of Germany

[73] Assignee: Siemens Aktiengesellschaft, Berlin and Munich, Fed. Rep. of Germany

[21] Appl. No.: 62,588

[22] Filed: Jun. 16, 1987

[30] Foreign Application Priority Data

Jun. 24, 1986 [DE] Fed. Rep. of Germany ....... 3621057

[51] Int. Cl.$^4$ .............................................. H01S 3/08
[52] U.S. Cl. ..................... 372/107; 372/20; 372/92
[58] Field of Search ..................... 372/20, 92, 107, 99, 372/26-32, 10

[56] References Cited

U.S. PATENT DOCUMENTS 3,396,343  8/1968  Wesselink ........................... 372/107
4,037,942  7/1977  Guyer ................................... 350/285
4,245,195  1/1981  Fahlen et al. ....................... 372/107
4,569,053  2/1986  Roullard, III et al. ............... 372/20

FOREIGN PATENT DOCUMENTS 3151228  7/1983  Fed. Rep. of Germany .
0147441  1/1981  German Democratic Rep. ... 372/20
2059143  4/1981  United Kingdom ................ 372/107

OTHER PUBLICATIONS

"Laser", W. Kleen and R. Muller.
"Laser Handbook" edited by M. L. Stitch, vol. 3.

Primary Examiner—William L. Sikes
Assistant Examiner—B. Randolph
Attorney, Agent, or Firm—Hill, Van Santen, Steadman & Simpson

[57] ABSTRACT

An optical resonator has two resonator mirrors disposed opposite one another on a mirror carrier which is divided at an angle relative to a perpendicular plane to the optical axis. Precise adjustment of the mirror spacing is provided by movement along the abutting faces at the dividing plane to match the mirror spacing to the wavelength of the laser emission for frequency tuning.

13 Claims, 1 Drawing Sheet

OPTICAL RESONATOR FOR A LASER

BACKGROUND OF THE INVENTION

1. Field of the Invention

The present invention relates generally to an optical resonator having a two resonator mirrors for use with a laser.

2. Description of the Related Art

An optical resonator having a pair of opposed resonator mirrors for a gas laser is disclosed in German Patent No. 31 51 228. The resonator mirrors are arranged at the end faces of a glass-ceramic mirror carrier, the end faces being ground and optically polished. In lasers of the type disclosed in the German Patent No. 31 51 228, optimum feedback is accomplished by providing an absolute distance L between the two resonator mirrors, the distance L being defined as $n \times x\lambda/2$, where n is a whole number $>> 1$. The distance L must be extremely precisely observed in a range of 1/10 micrometers through 1/100 micrometers. These high precision demands made of the resonator link L, however, are extremely difficult to meet when grinding and optically polishing the end faces of a mirror carrier.

For frequency tuning of gas lasers, it known from the publication Laser Handbook, Volume 3, 1979, North-Holland Publishing Company, pp. 71-78 to use a reflecting, optical grating instead of a second resonator mirror. The wavelength of the laser emission being tuneable on the basis of the angular position of the grating relative to the optical axis of the resonator. Optical gratings, however, are expensive and involved and result in optical losses.

From the publication Kleen/Mueller, Laser, Springer-Verlag (1969), pp. 310-313, it is known to set a resonator length through the use of piezo-electric elements to frequency tuning of a gas laser. The resonator mirrors are mounted on piezo ceramic mounts to enable the resonator length to be precisely determined. Such piezo-electric length adjustments, however, require involved control circuitry. Moreover, the piezo-electric adjustments cause amplitude modulation and frequency modulation, which is undesirable in highly stable systems.

SUMMARY OF THE INVENTION

It is an object of the present invention to provide optimally precise, defined and reproduceable matching of mirror spacing in an optical resonator at the lowest possible cost and in the simplest way.

This and other objects of the invention are achieved in an optical resonator having a mirror carrier divided at a plane proceeding obliquely relative to the optical axis of the resonator. The two carrier parts separated by the dividing plane are adjustable relative to one another at oblique seating surfaces facing one another so that the mirror spacing in the optical resonator can be varied.

In this way, a mirror carrier having two parts is created with oblique adjustment surfaces provided between the carrier portion for the first mirror and the carrier portion for the second mirror. The two carrier parts are displaceable relative to one another on wedge-like adjustment surfaces so that the absolute mirror spacing can be very precisely set in extremely small adjustment ranges, or increments.

According to the princples of the invention, the adjustment surfaces between the two portions of the mirror carrier are produced simply by oblique separation of an initially single piece mirror carrier. Alternately, the adjustment surfaces are provided by attaching or inserting a wedge or wedge-shaped carrier portion at one end of a single piece mirror carrier. The adjustment surfaces of one embodiment are produced by grinding and optically polishing the surfaces lying against one another. The optical resonator of the present invention, thus, guarantees extremely precise matching of the mirror spacing by permitting extremely small adjustments of the mirror spacing at very little expense and without additional devices.

A preferred embodiment of the invention has the dividing plane of the adjustment surfaces lying only a few arc seconds from a plane extending perpendicular to the optical axis of the resonator. The dividing plane is also preferably in the region of one end of the mirror carrier so that a smaller carrier part is formed having a wedge shape.

DESCRIPTION OF THE PREFERRED EMBODIMENTS

Figure 1:
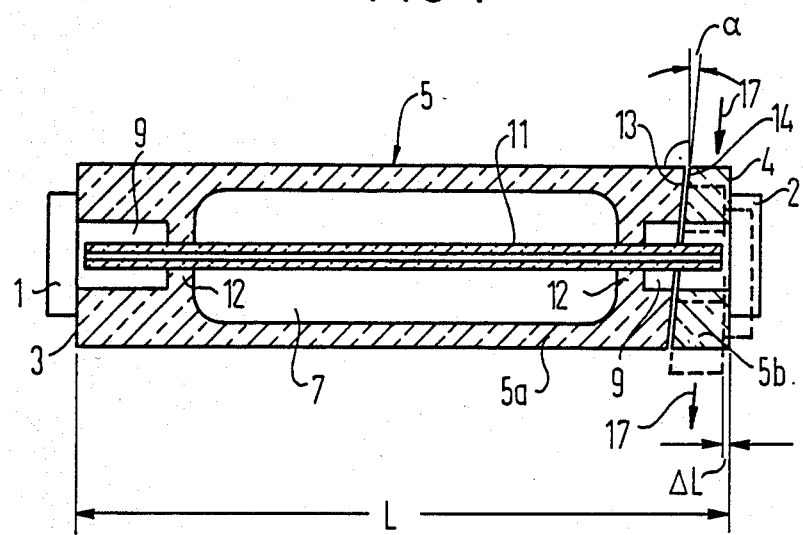
FIG. 1 is a longitudinal cross section of a first embodiment of an optical resonator according to the present invention.
Figure 2:
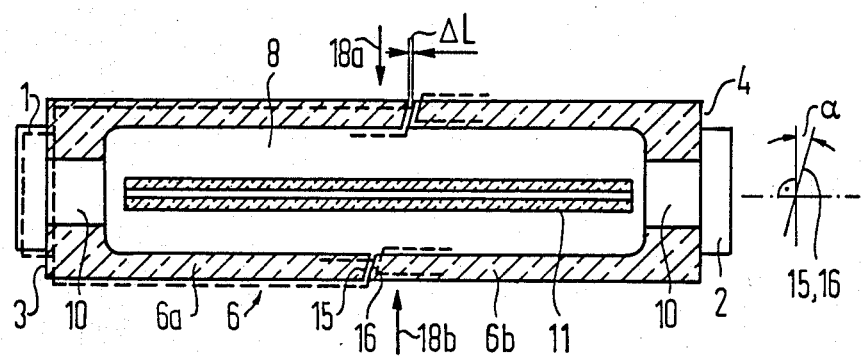
FIG. 2 is a longitudinal cross section of a second embodiment of an optical resonator.

In FIGS. 1 and 2, two embodiments of an optical resonator are shown having shared fundamental structures. The optical resonators are each composed of two resonator mirrors 1 and 2 residing opposite one another in parallel-planes. The mirrors 1 and 2 are disposed directly at the ends of ground and optically polished end faces 3 and 4, respectively of a block-shaped mirror carrier, the mirror carrier of FIG. 1 being referenced 5 and the mirror carrier of FIG. 2 being referenced 6. The mirror carriers 5 and 6 are composed of a material having an extremely low coefficient of thermal expansion, preferrably being of a glass-ceramic material. One example of a particularly suitable material is a glass-ceramic sold under the trademark "Zerodur" by the Schott Company.

The mirror carriers 5 and 6 have respective central recesses 7 and 8, as well as end recesses 9 and 10, respectively. A wave guide is provided in the embodiment of FIG. 1 comprising a small aluminum oxide tube 11 which is held by intermediate walls 12 formed between the central recess 7 and the end recesses 9. In the embodiment of FIG. 2, the wave guide comprising the small aluminum oxide tube 11 is mounted within the mirror carrier 6 although the mounting means is not shown. Of the two, the embodiment shown in FIG. 1, is the most practical in view of the wave guide mounting, since no additional mounting means is required.

Although the present invention may be used in a variety of different lasers, it is particularly well adapted for use in a $CO_2$ laser. In a $CO_2$ laser, the resonator mirrors 1 and 2 are formed of zinc selenide or of germanium and, in the simplest case, are held against the end faces 3 and 4 by a reduced pressure which prevails within the mirror carrier 5 or 6. This adequately fixes the mirrors 1 and 2 in place in many instances, for example, such as in a laboratory environment. In other cases, however, lasers which are used in mobil apparatus or systems expediently require the additional security of fixing the mirrors in position by clamping, glueing, or soldering.

One example of a mirror fastener is wire clamps (not shown) which press against the mirrors 1 and 2. Such means, however, are merely auxiliary fastening means and have no adjusting effect whatsoever.

The position of the two resonator mirrors 1 and 2 is guaranteed only by the mirror carriers 5 and 6 which carry the mirrors 1 and 2 exactly parallel and at a defined interval from one another. Thus, the mirror carriers 5 and 6 establish the stability of a distance L between the mirrors 1 and 2 and their angular position relative to one another. The mirror spacing L must be precisely observed for optimal feedback and is based on the relationship $L = n \times \lambda/2$, where n is as a whole number far greater than 1. For example, adjustment increments of $\Delta L = \mu/10$ through $\mu/100$ is required.

To be able to match the resonator length L as precisely as possible to the wavelength of the laser emission for frequency tuning, the mirror carriers 5 and 6 in both embodiments are divided in a plane extending at a slant relative the optical axis of the resonator. The dividing plane divides the mirror carrier 5 or 6 into two carrier parts 5a and 5b or 6a and 6b, respectively. The carrier parts 5a and 5b shown in FIG. 1 are adjustable relative to one another by movement in the direction of the arrows 17 for sliding movement along the oblique seating surfaces 13 and 14. Likewise, the carrier parts 6a and 6b are adjustable in the direction of the arrows 18a and 18b by sliding movement along the respective seating surfaces 15 and 16. As a result of the sliding adjustment movement along the dividing plane, the mirror spacing L and, thus the resonator length, is adjusted very precisely by a distance $\Delta L$ in extremely small increments of adjustment. For example, the carrier part 5b is shown in phantom in FIG. 1 moved in the direction of the arrow 17 to produce a change in resonator length $\Delta L$. As an adjusting means, adjustment screws (not shown) of a material having a low coeffecient of thermal expansion, such as Invar, are particularly well suited for providing adjusting movement in the present device. Any play in the adjustment screws is compensated by the transmission ratio of the wedge-like adjustment surfaces, play in the adjustment screws being small in comparison to the adjustment to be effected. The transmission ratio, for example, is selected to be about 1:100 through 1:1000. The maximum range of the adjustment distance $\Delta L$ max amounts to about 10 micrometers, which is approximately equivalent to a movement of the second carrier part 5b or 6b relative to the first carrier part 5a or 6a of about 1 millimeter for a transmission ratio of 1:100. As used herein, the term "transmission ratio" is the ratio of movement along the oblique seating surfaces 13 and 14 or 15 and 16 to relative longitudinal movement ($\Delta L$) of the two mirror carrier parts.

In the embodiment illustrated in FIG. 1, the dividing plane of the mirror carrier 5 is provided in the region of the right hand end of the carrier 5. As a result, the carrier 5 is divided into the longer carrier part 5a and the smaller carrier part 5b, the smaller part 5b being in the form of a narrow wedge. The two resonator mirrors 1 and 2 are, thus, no longer attached to a one piece mirror carrier, but rather the mirror 1 is directly secured to the end face 3 of the longer carrier portion 5a while the second mirror 2 is secured to the end face 4 of the wedge-shaped smaller part carrier portion 5b. The end face 4 of the small carrier part 5b is parallel to the end face 3 of the longer carrier part 5a. The dividing parting plane which forms the two oblique seating surfaces 13 and 14 abutting one another is preferably inclined at an extremely small angle $\alpha$ relative to a plane extending perpendicular to the optical axis of the resonator. In other words, the dividing plane lies at a slant relative to the parallel end faces 3 and 4 of the mirror carrier 5. The inclination angle $\alpha$ between the perpendicular plane and the dividing plane has a value of between zero and few arc seconds, and possibly may be as great as a few arc minutes, although a greater angle has been shown in the drawing figures for purposes of simplicity. Moreover, the slanted seating surfaces 13 and 14 lying against one another are ground and optically polished so that precisely planer wedge surfaces are formed for adjusting the smaller carrier part 5b relative to the longer carrier part 5a. Adjustment of the smaller carrier part 5b to set the mirror spacing L and, thus, match the resonator length to the wavelength of the laser emission is generally required only once. The adjustment can, if needed, be undertaken with the aid of guides (not shown) which enables only a straight line adjustment of the carrier parts 5a and 5b relative to one another and prevents any possible twisting or rotation of the carrier parts 5a and 5b relative to one another.

In the embodiment illustrated in FIG. 2, the mirror carrier 6 is formed with two end faces 3 and 4 lying parallel to one another. Instead of a longer carrier part and a narrow wedge, the mirror carrier 6 is formed of two carrier parts 6a and 6b of approximately equal size. The dividing plane is, thus, roughly situated in the middle of the mirror carrier 6. Otherwise, the seating surfaces 15 and 16 of the carrier parts 6a and 6b are formed just like the seating surfaces 13 and 14 in the embodiment of FIG. 1 in terms of their angle, surface quality, etc.

In the second embodiment, adjustment is performed just as in the first embodiment, i.e. by shifting one of the carrier parts relative to the other along the dividing plane. For example, the carrier part 6a is shifted in the direction of the arrow 18a on the seating surfaces 15 and 16 so that the resonator length changes by a distance $\Delta L$. As indicated in broken outline in FIG. 2, it is also, possible to adjust the second carrier part 6b relative first to the carrier part 6a by movement in the direction 18b. Fundamentally, as in the embodiment of FIG. 1, both carrier parts are adjustable relative to one another. It is, of course, possible to move the carrier parts in a direction opposite that indicated by the arrows to cause a change in length in an opposite direction.

There is, thus, provided an optical resonator having a mirror carrier divided into two parts at a dividing plane proceeding obliquely relative to a plane perpendicular to the optical axis for precise adjustment of the mirror spacing to accomplish frequency tuning. Extremely exact matching of the resonator length is, thus, achieved at very small increments of adjustment. The present invention is suitable for use in a variety of lasers, in general, and in particular for use in $CO_2$ lasers.

Although other modifications and changes may be suggested by those skilled in the art, it is the intention of the inventor to embody within the patent warranted hereon all changes and modifications as reasonably and properly come within the scope of his contribution to the art.

I claim:

1. An optical resonator for a laser having an optical axis, comprising:
   a mirror carrier having ground and optically polished opposite ends, said mirror carrier being of a material having an extremely low coefficient of thermal expansion;

first and second resonator mirrors disposed opposite one another on outside surfaces of said opposite ends of said mirror carrier; and said mirror carrier being divided into two parts at a dividing plane proceeding obliquely relative to a plane perpendicular to said optical axis of said optical resonator, said two parts being adjustable relative to one another in said dividing plane by slanted seating surfaces facing one another lying on said plane.

2. An optical resonator as claimed in claim 1, wherein said dividing plane of said mirror carrier is provided in a region of one end of said mirror carrier, said two parts of said mirror carrier including a smaller carrier part having a wedge-shape.

3. An optical resonator as claimed in claim 1, wherein said dividing plane is slanted at a very small angle relative to said plane extending perpendicular to the optical axis of said resonator, said very small angle having an inclination of between zero and a few arc minutes.

4. An optical resonator as claimed in claim 1, wherein said slanted seating surfaces of said two parts of said mirror carrier are ground and optically polished.

5. An optical resonator for use in a gas laser and having a longitudinally extending optical axis, comprising:

a first carrier portion having a first end face and an oblique seating surface opposite said first end face;

a second carrier portion having a second end face and an oblique seating surface opposite said second end face, said oblique seating surface of said second carrier portion abutting said oblique seating surface of said first carrier portion; and first end second optical resonator elements mounted on outside surfaces of respective ones of said first and second end faces, said first and second optical resonator elements being adjustable in their mutual spacing by slidably moving said first and second carrier portions in a plane of said oblique seating surfaces.

6. An optical resonator as claimed in claim 5, wherein said first and second end faces are parallel, and said first and second optical resonator elements are mirrors.

7. An optical resonator as claimed in claim 3, wherein said abutting oblique seating surfaces define a transmission ratio of between 1:100 and 1:1000 inclusive.

8. An optical resonator as claimed in claim 5, wherein said oblique seating surface are polished.

9. An optical resonator as claimed in claim 5, further comprising:

means for moving said first carrier portion relative to said second carrier portion along said abutting oblique seating surfaces.

10. An optical resonator as claimed in claim 9, wherein said moving means includes adjustment screws.

11. An optical resonator as claimed in claim 5, wherein said oblique seating surfaces are at an angle relative to a plane extending perpendicular to said optical axis, said angle being less than one degree of arc.

12. An optical resonator as claimed in claim 5, wherein said first and second carrier portions are of approximately equal size.

13. An optical resonator as claimed in claim 5, wherein said optical resonator is for use in a $CO_2$ laser.

* * * * *